(12) United States Patent
Panghal et al.

(10) Patent No.: US 10,278,132 B2
(45) Date of Patent: Apr. 30, 2019

(54) ELECTRONIC APPARATUS AND CONTROL METHOD THEREOF

(71) Applicant: Samsung Electronics Co., Ltd., Suwon-si, Gyeonggi-do (KR)

(72) Inventors: Amit Panghal, Bangalore (IN); Rana Prasad Sahu, Bangalore (IN); Karthikeyan Subramaniam, Bangalore (IN); Young-ki Hong, Seoul (KR); Jin-ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 15/401,415

(22) Filed: Jan. 9, 2017

(65) Prior Publication Data
US 2017/0201947 A1  Jul. 13, 2017

(30) Foreign Application Priority Data

Jan. 13, 2016 (IN) .............................. 201641001307
Sep. 7, 2016 (KR) ........................ 10-2016-0114809

(51) Int. Cl.
*H04W 52/02* (2009.01)

(52) U.S. Cl.
CPC ... *H04W 52/0261* (2013.01); *H04W 52/0245* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/166* (2018.01); *Y02D 70/21* (2018.01); *Y02D 70/26* (2018.01)

(58) Field of Classification Search
None
See application file for complete search history.

(56) References Cited

U.S. PATENT DOCUMENTS

| | | | |
|---|---|---|---|
| 9,629,109 B2* | 4/2017 | Hartman | H04L 43/0852 |
| 2010/0118180 A1* | 5/2010 | Matsushita | H04N 5/232 348/372 |
| 2010/0151851 A1* | 6/2010 | Bhatia | H04W 24/06 455/425 |

(Continued)

FOREIGN PATENT DOCUMENTS

| | | |
|---|---|---|
| JP | 2013-042269 A | 2/2013 |
| KR | 10-2010-0098049 A | 9/2010 |

OTHER PUBLICATIONS

European Search Report dated Jul. 17, 2018, issued in European Patent Application No. 17738640.6.

*Primary Examiner* — Alex Skripnikov
(74) *Attorney, Agent, or Firm* — Jefferson IP Law, LLP

(57) ABSTRACT

An electronic apparatus is provided. The electronic apparatus includes a communicator configured to perform communication with an external apparatus, a user interface configured to receive a user command, and a processor configured to, when an upload command to upload at least one content to the external apparatus is input, compute a time required to upload the at least one content to the external apparatus based on at least one parameter, determine whether an upload condition for uploading the at least one content satisfies a predetermined condition based on the computed time, control a time point for uploading the at least one content based on a result of the determination.

20 Claims, 11 Drawing Sheets

(56) References Cited

U.S. PATENT DOCUMENTS

| | | | |
|---|---|---|---|
| 2013/0144968 A1* | 6/2013 | Berger | H04L 67/32 709/217 |
| 2013/0282869 A1 | 10/2013 | Mate et al. | |
| 2014/0171077 A1 | 7/2014 | Itoh et al. | |
| 2014/0195805 A1 | 7/2014 | Koo et al. | |
| 2014/0310371 A1* | 10/2014 | Panchal | H04L 67/2842 709/213 |

* cited by examiner

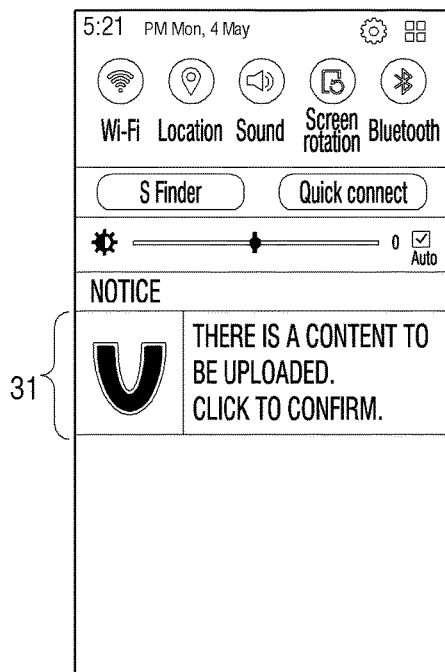

FIG. 6A CURRENT NETWORK STATE
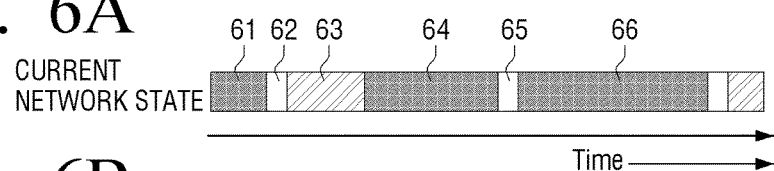
FIG. 6B UPLOAD DELAY MODE
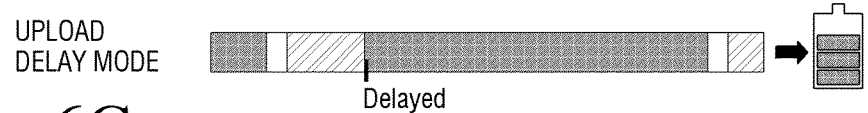
FIG. 6C UPLOAD OPTIMIZE MODE
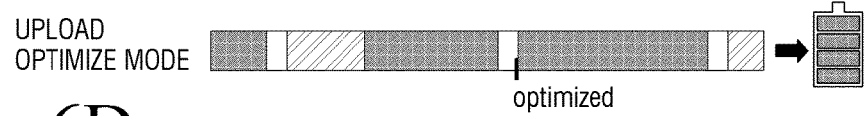
FIG. 6D IMMEDIATE UPLOAD MODE
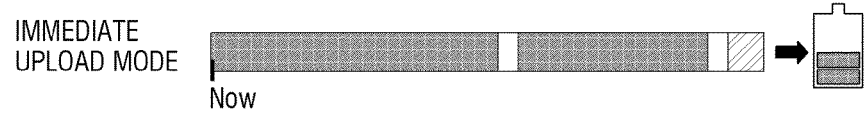
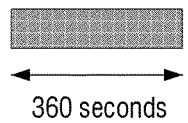

ELECTRONIC APPARATUS AND CONTROL METHOD THEREOF

CROSS-REFERENCE TO RELATED APPLICATIONS

This application claims the benefit under 35 U.S.C. § 119(a) of a Korean patent application filed on Sep. 7, 2016 in the Korean Intellectual Property Office and assigned Serial No. 10-2016-0114809, and of an Indian patent application filed on Jan. 13, 2016 in the Indian Patent Office and assigned Serial No. 201641001307, the entire disclosure of each of which is hereby incorporated by reference.

TECHNICAL FIELD

The present disclosure relates to an electronic apparatus and a control method. More particularly, the present disclosure relates to an electronic apparatus that is capable of uploading contents to an external apparatus and a control method thereof.

BACKGROUND

As functions of terminal apparatuses such as personal computers, notebooks, mobile terminals, and the like become more diversified, terminal apparatuses are being realized in forms of multimedia players having complex functions such as taking photographs or videos, playing music, video files, games, receiving broadcasts, etc.

Recently, it has become possible to access the Internet wirelessly using mobile terminals, upload or download various multimedia contents, and access certain websites to check and search various information. Especially, camera applications, photo album (gallery) applications, and the like support functions such that contents may be shared through real time dialogue applications, social network services (SNS) web sites or applications, cloud backup service applications, and the like.

However, uploading a file on a terminal apparatus such as a mobile phone or the like consumes a lot of battery power, and thus managing battery power is becoming a very important element in enabling a terminal apparatus to maintain an operating state for a minimum amount of time. Therefore, managing traffic in a device is very important in reducing power consumption of a battery. For example, when a signal intensity of a network is low, it takes a lot of time to upload contents, and thus a lot of battery power has to be consumed. Especially, if content uploading is not made at one time, but continues to fail, battery depletion will accelerate and problems of user inconvenience will occur such as the need for the user to restart the uploading, and so on.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus capable of controlling an uploading time point of contents, and a control method thereof.

In accordance with an aspect of the present disclosure, an electronic apparatus is provided. The electronic apparatus includes a communicator configured to perform communication with an external apparatus, a user interface configured to receive a user command, and a processor configured to, when an upload command to upload at least one content to the external apparatus is input, compute a time required to upload the at least one content to the external apparatus based on at least one parameter, determine whether an upload condition for uploading the at least one content satisfies a predetermined condition based on the computed time, and control a time point for uploading the at least one content based on a result of the determination.

In an embodiment, the at least one parameter comprises at least one of a parameter related to an internal environment of the electronic apparatus and a parameter related to a network environment in which the electronic apparatus performs communication with the external apparatus.

In an embodiment, the parameter related to the internal environment of the electronic apparatus may include at least one of a size of the at least one content, a residual quantity of the electronic apparatus, a load applied to the processor at a time point at which the upload command is input, and a memory size of the electronic apparatus, and the parameter related to the network environment may include at least one of a received signal strength information (RSSI) of the network, an available bandwidth of the network, a cell identifier (ID) of where the electronic apparatus is located, a round trip time (RTT) of the network, at least one transmission control protocol (TCP) path, and a piece of information on a destination to which the at least one content is to be uploaded.

In an embodiment, the predetermined condition may vary depending on an application in which the uploading of the at least one content is performed.

In an embodiment, if a RSSI value is sensed below of a predetermined intensity, a time point for uploading the at least one content in a backup application is delayed according to the upload condition, and a time point for uploading the at least one content in a Social Network Service (SNS) application is not delayed regardless of the upload condition.

In an embodiment, the processor may control the time point by uploading the at least one content to the external apparatus if the upload condition satisfies the pre-determined condition, and delaying uploading the at least one content if the upload condition does not satisfy the predetermined condition.

In an embodiment, the processor, if a predetermined event occurs in a state where the at least one content is being delayed, may re-compute the time required to upload the at least one content to the external apparatus and determine whether the upload condition for uploading the at least one content satisfies the predetermined condition based on the recomputed time, and re-determine whether to upload the at least one content according to a result of the determination.

In an embodiment, the processor may control the time point for uploading the at least one content according to a selected mode if a mode select command to select an uploading mode for the at least one content is input, wherein the uploading mode includes a first mode which the at least one content is uploaded immediately, and a second mode which the at least one content is uploaded at a determined time point.

In an embodiment, the processor may determine the time point at which power to be consumed by the uploading of the at least one content is minimized based on at least one of the computed time and the at least one parameter if a predetermined mode for controlling the time point is activated, and upload the at least one content at the determined time point.

In an embodiment, the electronic apparatus may further include a display, wherein the processor may predict an amount of power to be consumed while the at least one content is being uploaded based on the computed time, and control the display to display information indicating the predicted amount of power consumption.

In an embodiment, the predetermined event may include at least one of an event where an RSSI value is sensed same to or above of a predetermined intensity and an event where a time for which the uploading of the at least one content is delayed exceeds a predetermined time.

In accordance with another aspect of the present disclosure, a method for controlling an electronic apparatus is provided. The method includes receiving a command to upload at least one content to an external apparatus, computing a time required to upload the at least one content to the external apparatus based on at least one parameter when the command to upload is input, determining whether an upload condition for uploading the at least one content satisfies a predetermined condition based on the computed time, and controlling a time point for uploading the at least one content based on a result of the determination.

In an embodiment, the at least one parameter comprises at least one of a parameter related to an internal environment of the electronic apparatus and a parameter related to a network environment in which the electronic apparatus performs communication with the external apparatus.

In an embodiment, the parameter related to the internal environment of the electronic may include at least one of a size of the at least one content, a residual quantity of the electronic apparatus, a load applied at a time point at which the upload command is input, and a memory size of the electronic apparatus, and the parameter related to the network environment may include at least one of an RSSI of the network, an available bandwidth of the network, an ID of where the electronic apparatus is located, an RTT of the network, at least one TCP path, and a piece of information on a destination to which the at least one content is to be uploaded.

In an embodiment, the predetermined condition may vary depending on an application in which the uploading of the at least one content is performed.

In an embodiment, the controlling, if a RSSI value is sensed below of a predetermined intensity, may include a time point for uploading the at least one content in a backup application is delayed according to the upload condition, and a time point for uploading the at least one content in a Social Network Service (SNS) application is not delayed regardless of the upload condition.

In an embodiment, the controlling may include controlling the time point by uploading the at least one content to the external apparatus and delaying uploading the at least one content if the upload condition does not satisfy the predetermined condition.

In an embodiment, the method may further include, if a predetermined event occurs in a state where the at least one content is being delayed, re-computing the time required to upload the at least one content to the external apparatus, determining whether the upload condition for uploading the at least one content satisfies the predetermined condition based on the recomputed time, and re-determining whether to upload the at least one content according to a result of determination.

In an embodiment, the controlling may control the time point for uploading the at least one content according to a selected mode if a mode select command to select an uploading mode for the at least one content is input, wherein the uploading mode includes a first mode which the at least one content is uploaded immediately, and a second mode which the at least one content is uploaded at a determined time point.

In an embodiment, the controlling may include determining the time point at which power to be consumed by the uploading of the at least one content is minimized based on at least one of the computed time and the at least one parameter if a predetermined mode for controlling the time point is activated, and uploading the at least one content at the determined time point.

According to various embodiments of the present disclosure mentioned above, it is possible to minimize power consumption of a battery caused by uploading of contents.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWING

The above and other aspects, features, and advantages of certain embodiments of the present disclosure will be more apparent from the following description taken in conjunction with the accompanying drawings, in which:

FIGS. 3A, 3B, 3C, and 3D are views illustrating a method for controlling a time point of uploading in an uploading list appearing on an execution screen of an application for controlling uploading according to an embodiment of the present disclosure;

FIGS. 6A, 6B, 6C, and 6D are views illustrating differences in uploading time points according to three modes for uploading contents according to an embodiment of the present disclosure;

Throughout the drawings, it should be noted that like reference numbers are used to depict the same or similar elements, features, and structures.

DETAILED DESCRIPTION

Figure 1:
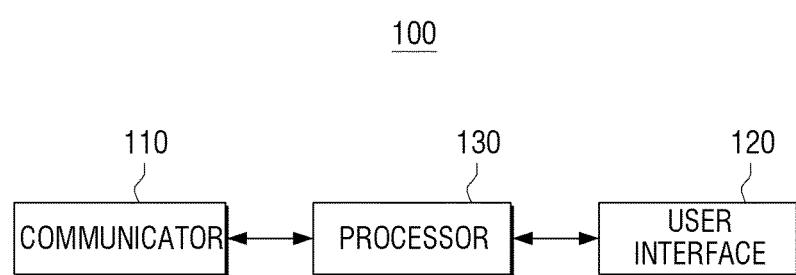
FIG. 1 is a block diagram schematically illustrating a configuration of an electronic apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to explaining embodiments of the present disclosure, an explanation will be made on a method by which embodiments of the present specification and drawings are disclosed.

First of all, the terms used in the present specification and the claims are general terms selected in consideration of the functions of the various embodiments of the present disclosure. However, these terms may vary depending on intention, legal or technical interpretation, emergence of new technologies, and the like of those skilled in the related art. Further, some of the terms may be ones arbitrarily selected by the applicant. Unless there is a specific definition of a term, the term may be construed based on the overall contents and technological common sense of those skilled in the related art.

Further, like reference numerals indicate like components that perform substantially the same functions throughout the specification. For the sake of explanation and understanding, different embodiments are described with reference to like reference numerals. That is, even if all the components in the plurality of drawings have like reference numerals, it does not mean that the plurality of drawings refer to only one embodiment.

Further, the terms including numerical expressions such as a first, a second, and the like may be used to explain various components, but there is no limitation thereto. These terms are used only for the purpose of differentiating one component from another, without limitation thereto. For example, a numerical expression combined with a component should not limit the order of use or order of arrangement of the component. When necessary, the numerical expressions may be exchanged between components.

In this specification, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

In the embodiments of the present disclosure, terms such as "module", "unit", "part", and the like are terms used to indicate components that perform at least one function and operation, and these components may be realized in hardware, software or in combination thereof. Further, except for when each of a plurality of "modules", "units", "parts", and the like needs to be realized in an individual hardware, the components may be integrated in at least one module or chip and be realized in at least one processor (not illustrated).

Further, in embodiments of the present disclosure, when it is described that a portion is connected to another portion, the portion may be either connected directly to the other portion, or connected indirectly via another medium. Further, when it is described that a portion includes another component, it does not exclude the possibility of including other components, that is, the portion may further include other components besides the described component.

Hereinafter, embodiments of the present disclosure will be explained with reference to the drawings.

FIG. 1 is a block diagram schematically illustrating a configuration of an electronic apparatus according to an embodiment of the present disclosure.

Referring to FIG. 1, the electronic apparatus 100 includes a communicator 110, a user interface 120, and a processor 130.

The electronic apparatus 100 may be realized as a wearable device or the like. Examples of the wearable device or the like that may be used herein include a computer, a notebook computer, a tablet personal computer (PC), a smart phone, a portable terminal, a personal digital assistant (PDA), a Motion Picture Experts Group phase 1 or phase 2 (MPEG-1 or MPEG-2) audio layer 3 (MP3), a smart appliance, smart glasses, a smart watch, and the like capable of executing a function of uploading to an external apparatus a file consisting of various contents such as a video file, audio file, image file, and text file, etc.

The communicator 110 is a configuration for performing communication with the external apparatus. Here, the external apparatus may be a server or an electronic apparatus being used by another user, that shares software resources such as data, a program and a file, and/or hardware resources such as a modem, a facsimile, a printer, and the like with the electronic apparatus 100, or that provides a certain service in response to a request from the electronic apparatus 100. For example, the external apparatus may be a cloud server that provides a space to store various contents such as photos, documents, videos, and the like, or a smart phone of another user, that can download data from the electronic apparatus 100.

The communicator 110 may perform communication with the external apparatus through various communication methods using a local area network (LAN), a cable, a wireless LAN, a cellular service, a device to device (D2D) service, Bluetooth, Bluetooth low energy (BLE), 3rd generation (3G), Wi-Fi, long term evolution (LTE), ad hoc method Wi-Fi direct and LTE direct, Zigbee, radio frequency (RF) such as near field communication (NFC), and infrared (IR), etc. For this purpose, the communicator 110 may include a Zigbee communication module, a Bluetooth communication module, a BLE communication module and a Wi-Fi communication, etc.

In an embodiment, the communicator 110 may upload various content files to the external apparatus. For example, in a state of being connected to at least one external apparatus through the Wi-Fi communication method, the communicator 110 may sequentially upload to at least one external apparatus at least one content stored in a storage included in the electronic apparatus 100 or stored in an external repository connected to the electronic apparatus 100.

The user interface 120 is a configuration for receiving a user command from the user.

In an embodiment, the user interface 120 is a configuration for receiving inputs of various commands related to uploading a content such as an input of selecting a content to be uploaded, selecting a destination of uploading, an upload command, and the like. The user interface 120 may include hardware such as a keyboard, a mouse, and the like, and a logical software element. In an embodiment, the user interface 120 may be realized as a touch display that is capable of receiving a touch input from the user. Here, the touch display may display a graphic user interface (GUI) consisting of graphics and texts, and may sense a user's touch input being made on the GUI and recognize a user command.

Configurations of the touch display when the user interface 120 is realized as a touch display will be explained hereinbelow with reference to FIG. 8.

Besides the aforementioned, the user interface 120 may include a configuration for sensing user interaction for controlling the overall operations of the electronic apparatus 100. In an embodiment, the user interface 120 may further include various interaction sensing apparatuses such as a microphone (not illustrated), and an infrared signal receiver (not illustrated), etc.

The processor 130 controls the overall operations of the electronic apparatus 100. In an embodiment, when a command to upload at least one content stored in an internal repository of the electronic apparatus 100 or in an external repository connected to the electronic apparatus 100 is input, the processor 130 may upload at least one content to the external apparatus. Here, the processor 130 may predict the time taken-to; -upload (TTU) required to upload at least one content to the external apparatus based on a predetermined parameter.

In an embodiment, at least one parameter is an element that may affect the TTU or an element that could affect scheduling of an uploading time point. The at least one parameter refers to a parameter predetermined in order to consider the uploading time point, and may include at least one of a parameter related to an internal environment of the electronic apparatus 100 and a parameter related to a network environment where the electronic apparatus 100 performs communication with an external apparatus.

In an embodiment, the parameter related to the internal environment of the electronic apparatus 100 may include at least one of a size of a content, a residual quantity of battery of the electronic apparatus, a load applied to the processor 130 at the time point at which the upload command is input, and a memory size of the electronic apparatus.

In an embodiment, at least one of a size of a content, a load applied to the processor 130 at the time point at which the upload command is input, and a memory size of the electronic apparatus 100 may be an element that can affect the TTU. For example, an image having a size of 3 MB has a relatively greater TTU than an image having a size of 1 MB. Further, the greater the load being applied to the processor 130 at the time point at which the upload command is input, and the smaller the memory size of the electronic apparatus 100, the greater the TTU.

Further, although the residual quantity of battery of the electronic apparatus 100 is not a parameter that is considered when predicting a TTU, it is a parameter that becomes the basis for comparing the residual amount of the battery with the battery consumption corresponding to the predicted TTU to determine the uploading time point.

Further, the parameter related to the network environment where the electronic apparatus 100 performs communication with an external apparatus may include at least one of a received signal strength information (RSSI) of the network, an available bandwidth of the network, a cell identifier (ID) of where the electronic apparatus 100 is located, a round trip time (RTT) of the network, at least one transmission control protocol (TCP) path, and information on a destination to upload the at least one content.

The RSSI of the network is an index meaning the intensity of power of a signal being received through the communicator 110 in a network environment of the electronic apparatus 100 for performing communication between the communicator 110 and the external apparatus. The unit of the RSSI is dBm, and generally, the greater the RSSI value, the better the network environment. For example, the range of the RSSI value is normally −99 to −35 dBm, and the higher its absolute value, the smaller the TTU value. Further, the greater the available bandwidth of the network, the smaller the TTU value. Meanwhile, based on the cell ID of where the electronic apparatus 100 is located, the uploading velocity in the cell of where the user of the electronic apparatus 100 is located among the network cells that a base station provides service may be predicted, and accordingly, the TTU may be predicted. Further, since the performance of the network differs according to various parameters such as a RTT, a packet loss rate, and the like, the processor 130 predicts the TTU in consideration of such parameters. Further, a difference of the TTU may occur depending on the network bandwidth of the TCP path distributed among applications where uploading of contents is performed. Here, the greater the bandwidth of the network of the TCP path allocated to the application where uploading is being performed, the smaller the TTU. Further, the farther away the destination to which at least one content is to be uploaded is from the electronic apparatus 100, the greater than TTU.

When the TTU is predicted, the processor 130 may determine whether an upload condition for uploading the at least one content satisfies a predetermined condition based on the predicted TTU, and control the time point at which at least one content is to be uploaded based on a result of the determination. That is, when a command to upload at least one content is received from the user through a certain application, the processor 130 may appropriately delay uploading of at least one content for which an upload command has been input, thereby controlling the uploading time point. Here, the processor 130 may control the uploading time point based on the TTU of the at least one content for which the upload command has been input and the at least one parameter. For example, in the case where the TTU necessary for performing uploading of the at least one content is or more than the predetermined time, it is possible to re-measure the TTU after a certain time, and perform uploading at the time point where the TTU measured is less than the predetermined time.

The processor 130 may determine whether the upload condition for uploading at least one content satisfies the predetermined condition based on the predicted TTU, and control the time point for uploading the at least one content based on the result of the determination. Here, the predetermined condition includes a condition where the TTU or the amount of power of battery being consumed by the uploading becomes less than a predetermined value based on the at least one parameter.

In an embodiment, the processor 130 may determine a certain condition for the residual amount of a battery, battery power to be consumed according to the predicted TTU, and the measured value of the RSSI of the network, and control such that a content is uploaded only when the determined condition is satisfied. In a more specific embodiment, the processor 130 may determine a certain condition for the residual amount of the battery, the battery power to be consumed according to the predicted TTU, and the measured value of the RSSI of the network, and control such that a content may be uploaded only when the determined condition is satisfied. In a more specific example, in the case where the residual amount of the battery of the electronic apparatus 100 is 15%, and the battery power to be consumed according to the predicted TTU is 20%, all of the battery of the electronic apparatus 100 will be consumed by the uploading, and thus even when a command to upload a content is received, the processor 130 may delay the uploading time point of the content until the battery power is sufficiently secured to 20% or more. Further, in the case where the measured value of the RSSI of the network is less than the predetermined value, that is a very low state, regardless of the predicted value of the TTU, the processor 130 may delay the uploading until the measured value of the RSSI of the network is equal to or more than the predetermined value. When the measured value of the RSSI is less than the predetermined value, that is, a low state, the user will have to re-try the uploading again due to uploading failure, which will increase the consumption of the battery. Therefore, it is desirable for the processor 130 to control such that the uploading is performed at a time point at which intervention of the user may be minimized as the RSSI value equal to or above the predetermined value is measured.

That is, in the case where the upload condition satisfies the predetermined condition, the processor 130 may upload at least one content to an external apparatus, and in the case where the upload condition does not satisfy the predetermined condition, the processor 130 may delay the uploading of the at least one content.

In determining whether the upload condition for uploading at least one content satisfies a predetermined condition, the predetermined condition may vary depending on the application in which the uploading of the at least one content is being performed. Examples of the application in which uploading of contents may be performed include an application providing a service for a storage space where contents may be automatically backed up through a cloud server, for example, backup applications such as Dropbox, Google Drive, Google photos, and Flickr, etc. Since these applications are not significantly affected even when somewhat of a delay occurs, they may have a relatively large tolerable range of time for the delay for reducing the battery consumption. That is, one can say that these applications have a relatively large delay tolerance factor value, and thus such applications will be called first applications hereinbelow.

Further, examples of applications in which uploading of contents may be performed include an application where a user may personally input an upload command to upload a content to an external server and share the content with other users connected with the external server, for example, social network service (SNS) applications such as Facebook, Twitter, Google+. These applications may have smaller tolerance ranges of time of delay for reducing the battery power consumption than the first applications. That is, these applications have relatively smaller delay tolerance factors than the first applications, and these applications will be called second applications hereinbelow.

Further, examples of applications in which uploading of contents may be performed include real-time messenger applications where, when a user personally inputs an upload command, a content is immediately uploaded to an external apparatus, so that the content may be shared with other users in real time, for example, Whatsapp, Line and Kakaotalk, etc.

In these applications, it is desirable that uploading is performed immediately after a content upload command is received in order to enable conversation in real time, and thus the tolerance range of time of delay for reducing the battery power consumption in uploading contents is relatively small. That is, one can say that these applications have relatively small delay tolerance factor values compared to the first and second applications, and these application will be called third applications hereinbelow.

In an embodiment, when the processor 130 determines whether an upload condition for uploading at least one content satisfies a predetermined condition, the predetermined condition may vary depending on in what application the uploading of at least one content is being performed. Contents being uploaded through the third applications may have a relatively eased condition for performing the uploading compared to the contents being uploaded through the first applications or the second applications.

When a predetermined event occurs in a state where uploading of at least one content is delayed, the processor 130 may re-compute the time required to upload the at least one content to an external apparatus, that is, the TTU, determine whether the upload condition for uploading the at least one content satisfies a predetermined condition based on the re-computed TTU, and re-determine whether to upload the at least one content depending on the result of determination.

Here, the predetermined event may be a change in a parameter that can have an effect in predicting the TTU, such as a change in the RSSI value, a change in the cell ID of where the electronic apparatus 100 is located, etc. For example, when an RSSI value equal to or above a predetermined value is sensed, the TTU may be re-computed. Examples of the predetermined event include an event where the time of delay of uploading of at least one content exceeds a predetermined time. For example, when the uploading time point of a content to be uploaded exceeds a delay time limit of 3 hours, uploading may be performed immediately.

Further, when a user's input requesting an immediate upload is received in a state where uploading of at least one content is being delayed, the processor 130 may immediately perform uploading of the delayed content in preference of the user's input regardless of the TTU.

The electronic apparatus 100 according to an embodiment of the present disclosure may be further provided with a display 140. Hereinafter, in relation to an embodiment where the electronic apparatus 100 provides a screen for controlling an uploading time point of a content through the display 140, various embodiments where the uploading time point may be controlled will be explained in more detail. In an embodiment, the display 140 illustrated in FIGS. 2A to 2C, FIGS. 3A to 3D and FIG. 5 is an example where a display is realized as a touch display configured to receive user inputs through touches.

Figure 2A:
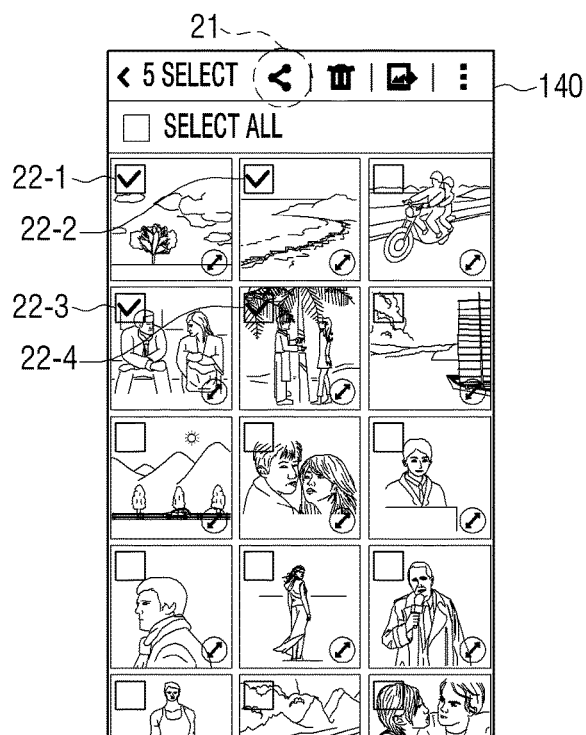
FIGS. 2A, 2B, and 2C are views illustrating a user interface (UI) screen that provides an upload optimizing option when uploading contents according to an embodiment of the present disclosure.
Figure 2B:
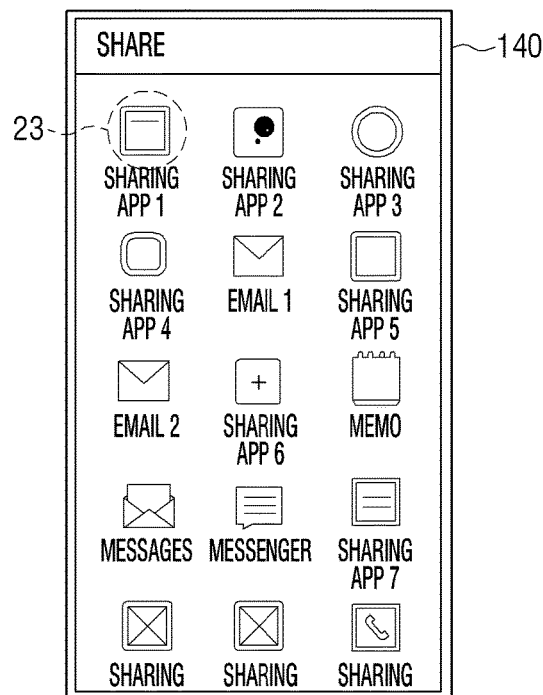
Figure 2C:
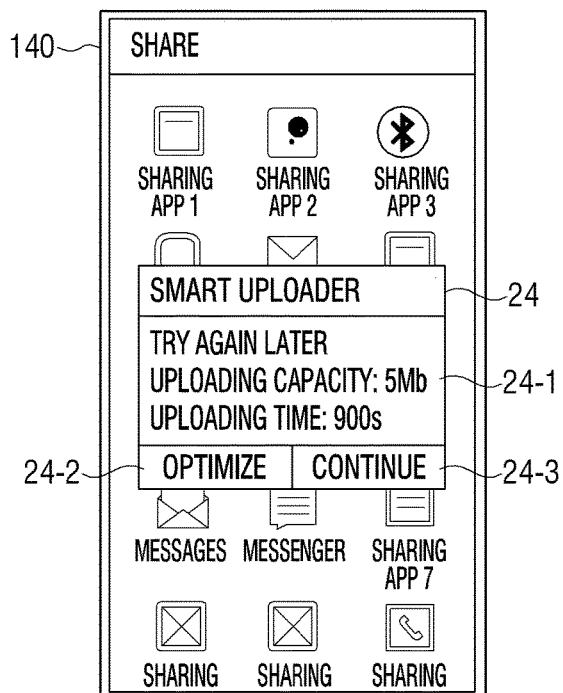

FIGS. 2A to 2C are views illustrating a UI screen that provides upload optimizing options when uploading contents according to an embodiment of the present disclosure.

Referring to FIGS. 2A to 2C, the electronic apparatus 100 may display through the display 140 a UI from which a content to upload may be selected. For example, as illustrated in FIG. 2A, from a UI screen where an image view application is executed, the electronic apparatus 100 may select images 22-1, 22-2, 22-3 and 22-4 to upload from a plurality of images being managed by the image view application. After selecting the images 22-1 to 22-4, when the user selects a share menu 21 from the menus appearing on a top end, a menu window 23 for selecting an application for uploading or sharing the selected images 22-1 to 22-4 may be displayed as illustrated in FIG. 2B.

When an input of selecting any one of the applications is received from the user through the menu window 23 displayed, the processor 130 may calculate the TTU needed to upload the content, execute the application (e.g., smart uploader) capable of controlling the uploading time point, and compute the time required to upload the content through the selected application (TTU). Here, the smart uploader may be an application that had already been in execution in the background of the electronic apparatus 100 even before the input for selecting any one of the applications was received from the user. When it is determined that the upload condition does not satisfy the predetermined condition based on the TTU computed by the smart uploader, the processor 130 may display the menu window 24 provided by the smart uploader as in FIG. 2C.

The menu window 24 may include an area 24-1 indicating a message notifying that since the current upload condition does not satisfy the predetermined condition, it is desirable to delay the uploading time point (a phrase such as, for example, "warning: try again later"), an uploading size, and time it takes for the uploading, and an optimizing menu 24-2 that optimizes the uploading time point so that uploading is automatically performed when a time point arrives where the upload condition satisfies the predetermined condition, and a continuing menu 24-3 that disregards the warning and enables uploading to be performed immediately. When the user selects the continuing menu 24-3, a content selected in preference to the user's select command than the determination on whether the predetermined condition is satisfied may be immediately uploaded.

FIGS. 3A to 3D are views illustrating a method for controlling an uploading time point, in an upload list shown on an execution screen of an upload controlling application according to an embodiment of the present disclosure.

Referring to FIGS. 3A to 3D, in the case where a content selected by a user is being uploaded or being delayed, the upload state of the selected content may be checked in the smart uploader. As illustrated in FIG. 3A, it is possible to have the smart uploader to be executed in the background, and the display 140 may provide a UI screen that may include simple notice information 31 that there is a content that is expected to be uploaded or is being uploaded in the smart uploader that is in execution in the background.

When the user selects the notice information 31, a list consisting of a content item waiting to be uploaded 32-1, a content item that is being uploaded 32-2, a content item of which uploading has been completed 32-3, 32-4 may be displayed on the execution screen of the smart uploader, as illustrated in FIG. 3B.

In each content item 32-1-32-4, the type of the application that uploaded the content, file name of the content, size and uploading state of the content may be displayed, and especially, in the content item 32-2, a press bar 32-5 indicating the proceeding state of the uploading may be displayed.

When the user selects the content item 32-1 that is waiting, since the current upload condition does not satisfy the predetermined condition as illustrated in FIG. 3C, a menu window 33 including a message notifying that it is desirable to delay the uploading time point may be displayed. The menu window 33 may include an optimizing menu 33-2 that optimizes the uploading time point to enable automatic uploading when a time point where the upload condition satisfies the predetermined condition arrives and a continuing menu 33-3 for disregarding the warning and enabling immediate uploading.

When the user selects the continuing menu 33-3, as illustrated in FIG. 3D, the processor 130 may upload the content selected in preference to the user's select command than the determination on whether the predetermined condition is satisfied, and display the progress bar 32-6 indicating the proceeding state of uploading.

Figure 4:
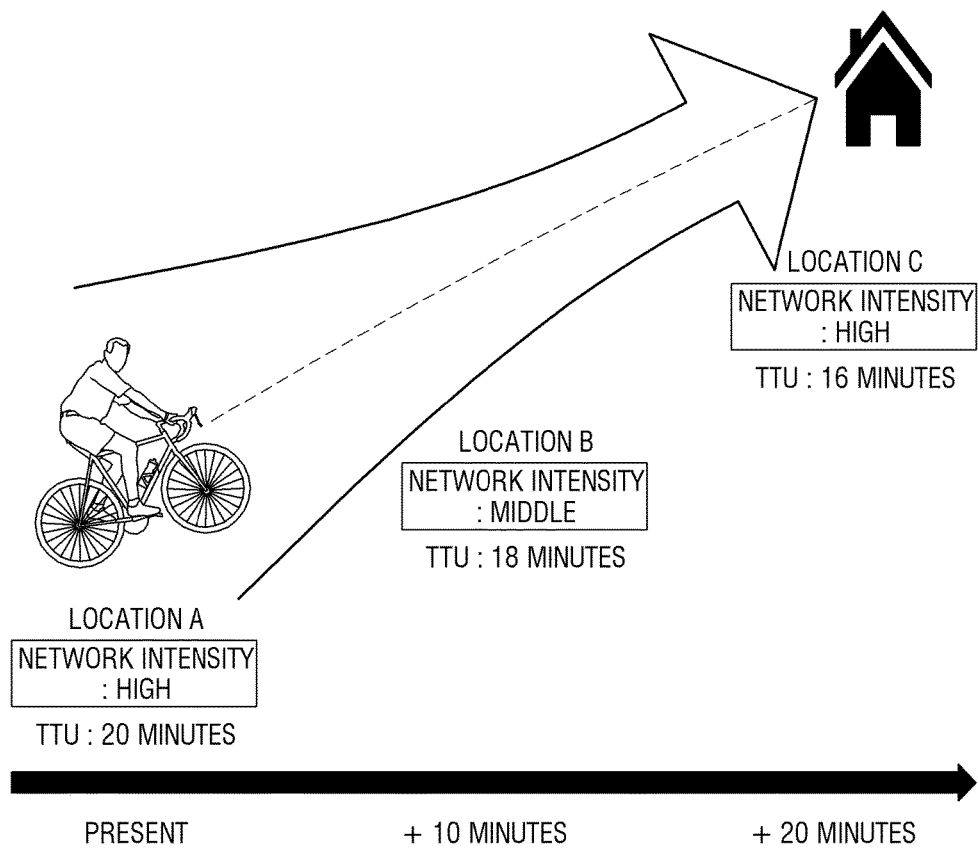
FIG. 4 is a view provided to explain a change in a time taken-to-upload (TTU) caused by a change in a user's position according to an embodiment of the present disclosure.

FIG. 4 is a view provided to explain changes in TTU according to changes in the user's location according to an embodiment of the present disclosure.

Referring to FIG. 4, in a state where uploading of at least one content is delayed, when a predetermined event occurs, the processor 130 may re-compute the time required to upload at least one content to the external apparatus, determine whether the upload condition for uploading at least one content satisfies the predetermined condition based on the re-computed time, and re-decide whether to upload the at least one content according to the result of determination.

According to the illustration in FIG. 4, in the case where the user of the electronic apparatus 100 is riding a bicycle to go home, the TTU of the content for which uploading is delayed may be re-computed according to the changes in location of the electronic apparatus 100, and the time point of performing the uploading may be scheduled according to the re-computed TTU. In an embodiment, it may be a case where the user is moving from a current location A to home. Here, a path to go through from the current location to home, and a pattern of intensities of network signals according to the path may be pre-recorded in the electronic apparatus 100. Here, the intensities of the network signals may be predetermined to three levels: high, medium and low, according to ranges of a predetermined value. Assuming that the intensity of the network signal of an area where the electronic apparatus 100 is currently located is 'high', the intensity of the network signal of location B, that is an intermediate location from the user's current location and the user's home, is 'medium', and the intensity of the network signal at the user's home (location C) is 'high', the TTU may be re-computed according to changes of the intensity of the network signal as the user moves from the current location A, to location B and the location C, and accordingly, the TTU at location A, location B and location C may be computed differently.

At the current location A, the processor 130 may calculate the TTU of the content based on a motion speed of the user and the changes in pattern of the intensities of the network signals, and when uploading starts at location A, the TTU may be predicted as 20 minutes. As the user moves to location B and location C, the user may predict the TTU of location B and location C. Here, supposing that it takes 10 minutes for the user to move from location A to location B, if the intensity of the signal within the range from location A to location B is uniformly 'high', when the user arrives at location B, a half of the total size of the content to be uploaded should have already been uploaded, and the TTU at location B should be predicted as 10 minutes. However, if the intensity of the signal at location B is 'medium', and the intensity of the network signal gets worse while moving from location A to location B, only 1/10 of the total size of the content to be uploaded may be uploaded. Herein, the TTU predicted at location B becomes 18 minutes. Meanwhile, supposing it takes 20 minutes for the user to move from location A to location C, if the intensity of the signal within the range from location A to location C is uniformly 'high', when the user arrives at location C, the uploading of the content to be uploaded must be completed, and the TTU at location C must be 0 minute. However, if the intensity of the signal at location B is 'medium', and the intensity of the signal gets worse while moving from location B to location C, and then gets better to 'high' at location C, only 1/5 of the total size of the content to be uploaded may be uploaded. Here, the TTU predicted at location C becomes 16 minutes. When the user arrives at location C where the TTU is the smallest, the processor 130 may control to start the content uploading. Accordingly, by reducing the TTU than when the electronic apparatus 100 is in location A or location B, it is possible to minimize the amount of battery power being consumed by the uploading.

Figure 5:
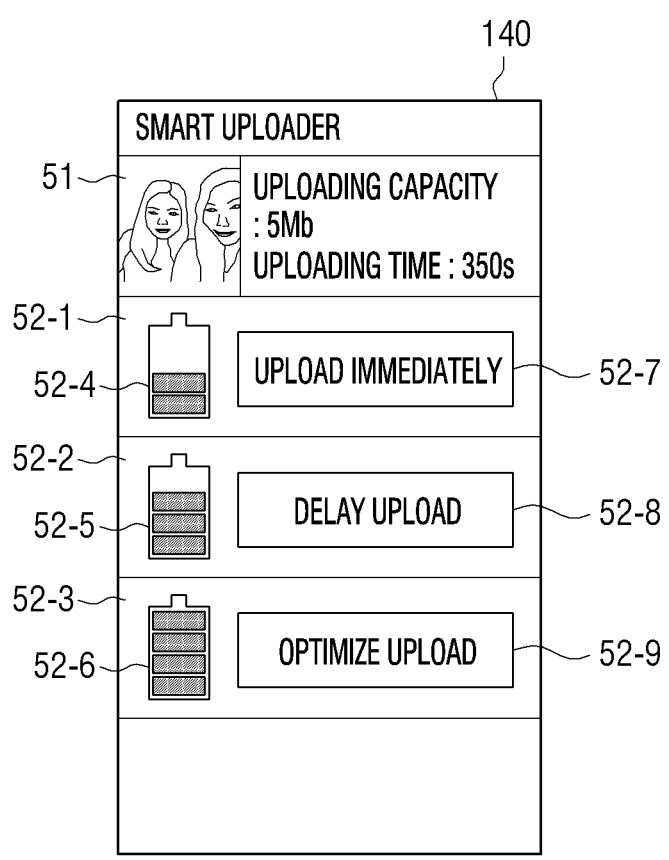
FIG. 5 is a view illustrating three modes for uploading contents according to an embodiment of the present disclosure.

FIG. 5 is a view illustrating three modes for uploading contents according to an embodiment of the present disclosure.

Referring to FIG. 5, when the user receives a command to upload at least one content from the user, the processor 130 may perform uploading according to any of a first mode (immediate upload mode) enabling an immediate upload, a second mode (upload delay mode) enabling an upload after a time determined by the user, and a third mode (upload optimizing mode) enabling an upload at an uploading time point determined based on the TTU computed based on the at least one parameter. Here, the processor 130 may predict the amount of power to be consumed when at least one content is uploaded in each mode based on the computed TTU, and control the display 140 to display information representing the predicted amount of power consumption.

Referring to FIG. 5, when a command to upload a content is input, the processor 130 may receive a command of selecting the upload mode for at least one content through the UI provided through the smart uploader, and when a command of selecting a mode is input by the user, the processor 130 may control the time point of uploading at least one content according to the selected mode. In an embodiment, as illustrated in FIG. 5, the smart uploader may include a UI screen including an item 51 indicating information on the content to be uploaded (size of the content, time it takes for the uploading and so on), and a mode select menu 52-1, 52-2, and 52-3 for selecting any one mode of the first mode to the third mode. Here, the mode select menu 52-1~52-3 may each include information 52-4, 52-5, and 52-6 indicating the amount of battery power to be consumed when uploading is performed according to each mode. Here, the information 52-4~52-6 indicating the amount of battery power to be consumed in each mode may be predicted based on the TTU computed through the processor 130 and the at least one parameter. Further, the mode select menu 52-1~52-3 may each include a button 52-7, 52-8, and 52-9 for receiving a mode select command from the user.

For example, when the user selects the third mode (upload optimizing mode), if the selected mode is activated, the processor 130 may determine an uploading time point at which the power to be consumed by uploading of the selected content is minimized, and control to upload the selected content at the determined uploading time point. Otherwise, the processor 130 may control to perform uploading at a time point where the selected content can be uploaded based on the at least one parameter such as the residual amount of battery, load to be applied to the processor 130, state of the network, and the like.

FIGS. 6A to 6D are views illustrating differences in uploading time points according to three modes for uploading contents according to an embodiment of the present disclosure.

Referring to FIGS. 6A to 6D, the processor 130 may control an uploading time point according to any one mode of the upload delay mode, the upload optimizing mode and the immediate upload mode.

As illustrated in FIG. 6A, a current network state may be sequentially changed by time from an ON state where the network is activated (a state where connection is made to enable uploading of contents) 61, a transient state 62, an OFF state 63 where the network is inactivated (a state of disconnection and thus uploading of contents is not possible), an ON state 64, a transient response state 65, and an ON state 66.

FIG. 6B illustrates a state where the user sets such that uploading is performed when the network is changed to an ON state after a predetermined time in the case of uploading contents according to the upload delay mode. Supposing the predicted TTU of the content to be uploaded when the network is at an ON state is 360 seconds, when the user set such that uploading is performed after the predetermined time in the upload delay mode, the processor 130 may control the uploading time point such that uploading is performed when the network is changed to the ON state 64 for the first time after the predetermined time. In this case, the amount of battery consumption due to uploading may be smaller than the upload optimizing mode but greater than the immediate upload mode.

FIG. 6C illustrates uploading being performed at an optimized time point such that the uploading is performed completely for 360 seconds when uploading according to the upload optimizing mode. The processor 130 predicts changes in the network environment by time, and determines whether uploading can be performed without intervals in the ON state 61, 64 of the network. When it is determined that the ON state 61, 64 of the network is shorter than the TTU (360 seconds) due to a change to an OFF state of the network, electrostatic discharge (ESD), electrical fast transient (EFT), surge, and the like, the processor 130 may control such that uploading is performed at a time point when the network is changed to an ON state 66 after a transient 65 to enable uploading to be performed at the ON state 66 where an ON state can be maintained for 360 seconds or more. In this case, the amount of battery consumption due to uploading may be minimum.

Meanwhile, as illustrated in FIG. 6D, in the case of performing uploading according to the immediate upload mode, an upload may be performed at the time point the immediate upload mode is selected without considering the current network state. In this case, the amount of battery consumption due to uploading may be maximum.

Figure 7:
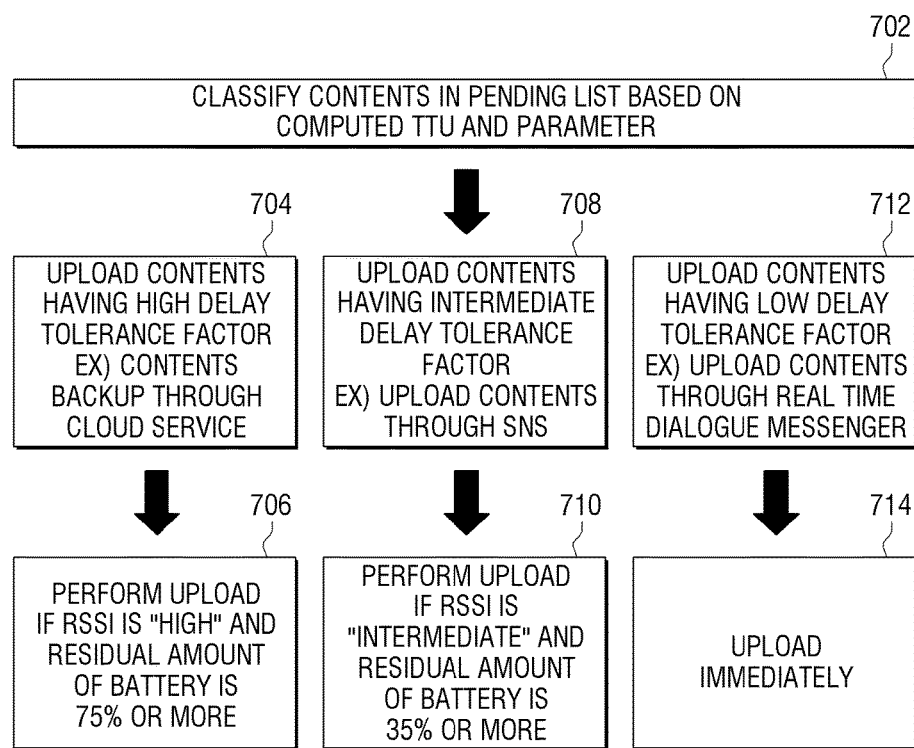
FIG. 7 is a view provided to explain how uploading conditions are varied depending on a TTU of contents and a type of an application where the uploading is being performed according to an embodiment of the present disclosure.

FIG. 7 is a view provided to explain varying conditions for performing uploading according to the TTU of contents and the type of application where the uploading of content is being performed according to an embodiment of the present disclosure.

Referring to FIG. 7, when it is determined that the upload condition does not satisfy a predetermined condition based on the computed TTU and a predetermined parameter, the processor 130 may delay uploading of at least one content. Here, the delayed content may be added to a pending list consisting of delayed contents, and the contents included in the pending list may be uploaded in the order of pending, and in the order the predetermined condition is satisfied. The processor 130 may classify the contents in the pending list based on the computed TTU and various criteria based on the predetermined parameter 702. In an embodiment, the processor 130 may classify the contents in the pending list based on in what application the uploading of the content is being performed. For example, in the case where the uploading is being performed in an application having a low delay tolerance factor value such as a real time dialogue messenger, its upload priority order in the pending list may be set high, and in the where the uploading is being performed in an application having a high delay tolerance factor value such as the cloud service, its upload priority order in the pending list may be set low.

In a more specific example, in the case where an application for uploading contents has a delay tolerance factor value of a high level as in the case where a content is being backed up through the cloud service 704, the processor 130 may control the uploading time point such that uploading is performed when all the condition of the RSSI of the network being high and the condition of the residual amount of battery of the electronic apparatus 100 being 75% or more are satisfied 706. Further, in the case where an application for uploading contents such as SNS such as the Facebook, Twitter, and the like has a delay tolerance factor value of an intermediate level 708, the processor 130 may control the uploading time point such that uploading is performed when all the condition of the RSSI of the network being 'medium' and the residual amount of battery of the electronic apparatus 100 being 35% or more are satisfied 710. Further, in the case where an application for uploading contents, such as real time dialogue messengers such as Kakaotalk, Whatsapp, and the like has a delay tolerance factor value of a low level 712, the processor 130 may control the uploading time point such that uploading is performed immediately regardless of the RSSI of the network and the residual amount of battery 714.

In an embodiment of the present disclosure, when the electronic apparatus 100 is realized as a smart phone and the external apparatus is realized as a wearable apparatus (smart watch, and the like) that communicates with the smart phone 100 in a short distance, the smart phone 100 may exchange various sensing data such as housekeeping data, exercising record, and the like with the wearable apparatus. In this case, the uploading time point may be controlled when the smart phone 100 uploads data to the wearable data, in which case the application used for uploading data to the wearable apparatus may have a high delay tolerance factor. Also in the case where the electronic apparatus 100 is realized as a wearable apparatus and the external apparatus is realized as a smart phone on the contrary, the wearable apparatus 100 may perform uploading having a high delay tolerance factor to the smart phone.

In a case where the electronic apparatus 100 is realized as a smart phone and the external apparatus is realized as a health measurement device, when the smart phone 100 is uploading biological data sensed from the user to a health measurement device, the smart phone 100 may be set to perform uploading having a low delay tolerance factor, and accordingly, the health measurement device may be controlled to immediately upload the biological data to the health measurement apparatus.

Figure 8:
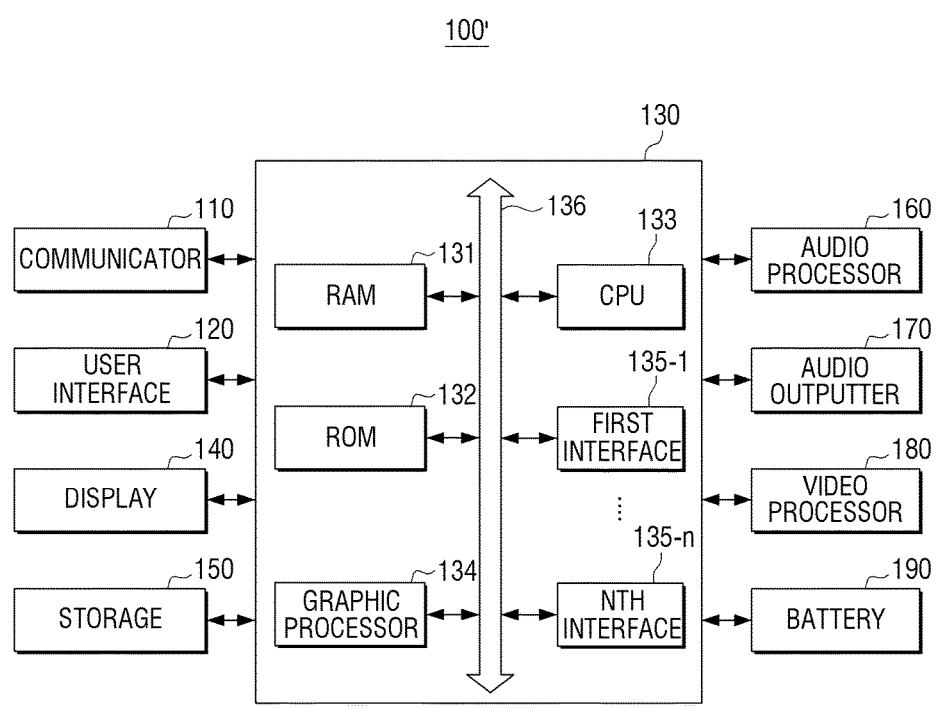
FIG. 8 is a block diagram illustrating a configuration of an electronic apparatus according to an embodiment of the present disclosure.

FIG. 8 is a block diagram illustrating a configuration of the electronic apparatus according to another embodiment of the present disclosure.

Referring to FIG. 8, the electronic apparatus 100' includes a communicator 110, a user interface 120, a processor 130, a display 140, a storage 150, an audio processor 160, an audio outputter 170, a video processor 180 and a battery 190. Hereinafter, explanation on portions overlapping with explanation in FIG. 1 will be omitted.

As illustrated in FIG. 8, the processor 130 includes a random access memory (RAM) 131, a read only memory (ROM) 132, a central processing unit (CPU) 133, a graphic processor 134, a first to nth interface 135-1~135-n, and a bus 136. Here, the RAM 131, the ROM 132, the CPU 133, the graphic processor 134, the first to nth interface 135-1~135-n, and the bus 136 may be connected to one another through the bus 136. However, there is no limitation to the configuration of the processor 130, and thus the processor 130 may of course be configured with various apparatuses capable of performing the same or similar functions as the RAM 131, the ROM 132, the CPU 133 and the graphic processor 134.

In the ROM 132, a set of commands for system booting and the like are stored. The CPU 133 copies various application programs stored in the storage 150 to the RAM 131, and executes the application programs coped to the RAM 133 to perform various operations. For example, the CPU 133 may execute a module copied to the storage 150 to predict the TTU of the content to be uploaded, and schedule the uploading time point of the subject content.

The graphic processor 134 uses an operating part (not illustrated) and a rendering part (not illustrated) to generate a screen that includes various objects such as icons, images, texts, and the like. The operating part operates attribute values such as a coordinate value, a form, a size, a color, and the like for each object to be displayed according to the layout of the screen. The rendering part generates screens of various layouts including objects based on the attribute values operated in the operating part.

The CPU 133 accesses the storage 150 and performs booting using an O/S stored in the storage 150. Further, the CPU 133 performs various operations using various programs, contents, data, and the like stored in the storage 150.

The first to nth interfaces 135-1~135-n are connected to the various elements mentioned above. One of the interfaces may be a network interface connected to the external apparatus through the network.

The display 140 is a configuration for displaying various GUIs and contents. In an embodiment, the display 140 may display a screen for selecting a content to be uploaded, a screen for selecting the external apparatus to upload the content, a screen indicating the uploading situation, and the like according to a control of the processor 130.

Further, in the case where the display 140 is realized as a touch display, a coordinate corresponding to a position where a sensed touch of the user is input may be transmitted to the processor 130 such that a function corresponding to the input touch may be executed.

The display 140 may be realized as a liquid crystal display panel (LCD), an organic light emitting diode (OLED), and the like, but without limitation thereto. Further, in the display 140, a driving circuit, a backlight unit, and the like that may be realized in the form of an a-si thin film transistor (TFT), a low temperature poly silicon (LTPS) TFT, an organic TFT (OTFT), and the like may be included as well. In an embodiment, when the display 140 is realized as a touch display, the display 140 may be one where a display panel consisting of an LCD, an OLED, and the like and an input sense panel are structurally integrated. Here, the input sense panel may sense various inputs such as a single or multi-touch input, a drag input, a writing input, a drawing input, and the like made by the user using various objects such as fingers, electronic pens, and the like. The input sense panel may be realized using one panel where both finger inputs and pen inputs can be sensed, or using two panels such as a touch panel where finger inputs can be sensed and a pen recognition panel where pen inputs can be sensed.

The storage 150 may store the contents to be uploaded, and besides that, it is a configuration for storing various modules for driving the electronic apparatus 100'. The storage 150 may be realized as one of a hard disk drive (HDD), a solid state drive (SSD), a dynamic RAM (DRAM) memory, a static RAM (SRAM) memory, a ferroelectric RAM (FRAM) memory and a flash memory. In an embodiment, the configuration of the storage 150 will be explained with reference to FIG. 9.

Figure 9:
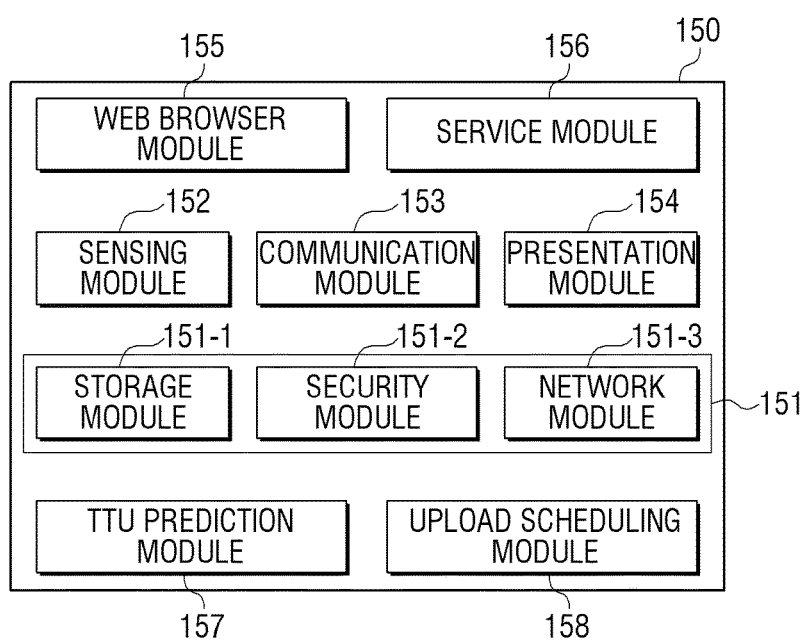
FIG. 9 is a block diagram illustrating a configuration of a system module of a storage according to an embodiment of the present disclosure.

FIG. 9 is a block diagram illustrating a configuration of a system module of a storage according to an embodiment of the present disclosure.

Referring to FIG. 9, in the storage 150, software including a base module 151, sensing module 152, a communication module 153, a presentation module 154, a web browser module 155, a service module 156, a TTU predicting module 157, and an upload scheduling module 158 may be stored.

The base module 151 refers to a basic module for processing signals transmitted from each hardware included in the electronic apparatus 100' and transmitting the processed signals to an upper layer module. The base module 151 includes a storage module 151-1, a security module 151-2, and a network module 151-3, etc. The storage module 151-1 is a program module for managing a database (DB) or a registry. The security module 151-2 is a program module that supports certification, permission, secure storage, and the like for hardware, and the network module 151-3 is a module that supports network connection, including a DNET module, and a UPnP module, etc.

The sensing module 152 is a module for collecting information from each sensor and analyzing and managing the collected information.

The communication module 153 is a module for performing communication with outside. The communication module 153 may include an IR communication module and an RF communication module, and further include a messaging module and a telephone module.

The presentation module 154 is a module for configuring a display screen. The presentation module 154 includes a multimedia module for playing and outputting a multimedia content, and a UI rendering module for performing graphic processing.

The web browser module 155 refers to a module for performing web browsing to access a web server. The web browser module 155 may include a web view module for configuring a web page, a download agent module for performing downloading, a bookmark module, a webkit module, and the like.

The service module 156 is a module including various applications for providing various services. In an embodiment, the service module 156 may include various modules such as an SNS program, a contents replay program, a game program, an E-book program, a calendar program, an alarm management program, other widgets, and the like.

The TTU predicting module 157 may activate a support vector regression (SVR) math tool and predict the TTU. Unlike a general linear regression method, the SVR analysis method using the SVR math tool may allocate a weighted value to each parameter based on an actual contribution to predicting the currently predetermined parameter. Using the TTU of a certain content predicted as aforementioned and the weighted average value of the previously predicted TTU, the TTU of the content may be finally predicted. A difference between the predicted TTU and the actual TTU (error) value may be used as a weighted value for predicting a future TTU.

The upload scheduling module 158 is a module for determining whether the upload condition for uploading contents satisfy a predetermined condition and for determining an uploading time point according to the result of determination based on the predicted TTU and the at least one parameter. Here, the upload scheduling module 158 may determine the time point where the power consumed by uploading of the content is minimized as the uploading time point. Further, when there is a request to upload a plurality of contents, the upload scheduling module 158 may determine and schedule the uploading time point of each content.

Referring again to FIG. 8, the audio processor 160 is an element for processing audio data. In the audio processor 160, various processings such as decoding of audio data, or amplification, noise filtering, and the like may be performed. Meanwhile, the audio processor 160 may be provided with a plurality of audio processing modules in order to process audio corresponding to the plurality of contents.

The audio outputter 170 is a configuration for outputting audio, and may be realized as a speaker and the like.

The video processor 180 is a configuration for processing various image contents. In the video processor 180, various image processings such as decoding, scaling, noise filtering, frame rate conversion, resolution conversion, and the like regarding the image contents may be performed. Meanwhile, the video processor 180 may be provided with a plurality of image processing modules in order to process images corresponding to the plurality of contents.

Figure 10:
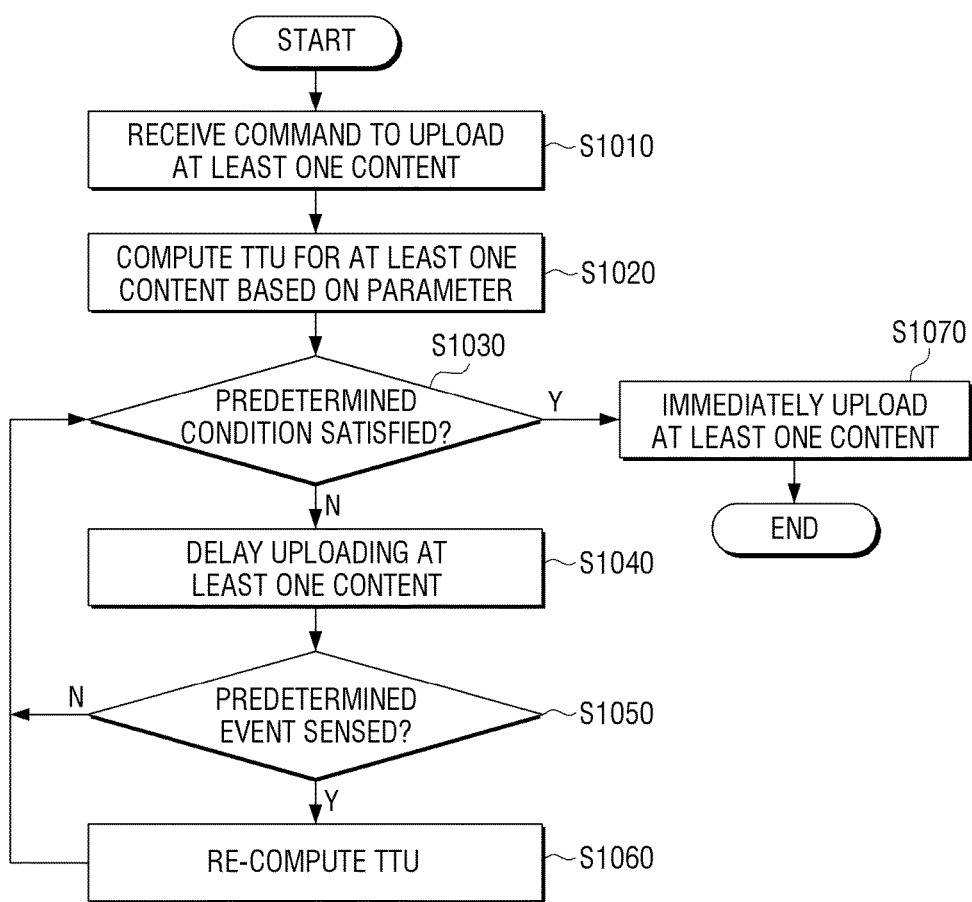
FIG. 10 is a flowchart provided to explain a method for controlling a time point to upload a content based on a TTU according to an embodiment of the present disclosure.

FIG. 10 is a flowchart provided to explain a method for controlling the uploading time point of contents based on the TTU according to an embodiment of the present disclosure.

Referring to FIG. 10, an upload command for at least one content is received at operation S1010.

A TTU of the at least one content is computed based on an at least one parameter at operation S1020.

Here, based on the computed TTU, it is determined whether the upload condition for uploading the at least one content satisfies a predetermined condition at operation S1030.

When it is determined that the upload condition for uploading the at least one content satisfies the predetermined condition at operation S1030: Y, the at least one content is uploaded immediately at operation S1070. When it is determined that the upload condition for uploading the at least one content does not satisfy the predetermined condition at operation S1030: N, uploading of the at least one content is delayed at operation S1040.

It is determined whether a predetermined event is sensed at operation S1050, and if the predetermined event is sensed at operation S1050: Y, the TTU of the at least one content is re-computed at operation S1060, and it is re-determined whether the predetermined conditions is satisfied based on the re-computed TTU at operation S1030. If the predetermined event is not sensed at operation S1050; N, it returns to operation S1030 without re-computing the TTU, and determines whether the predetermined condition is satisfied at operation S1030.

Figure 11:
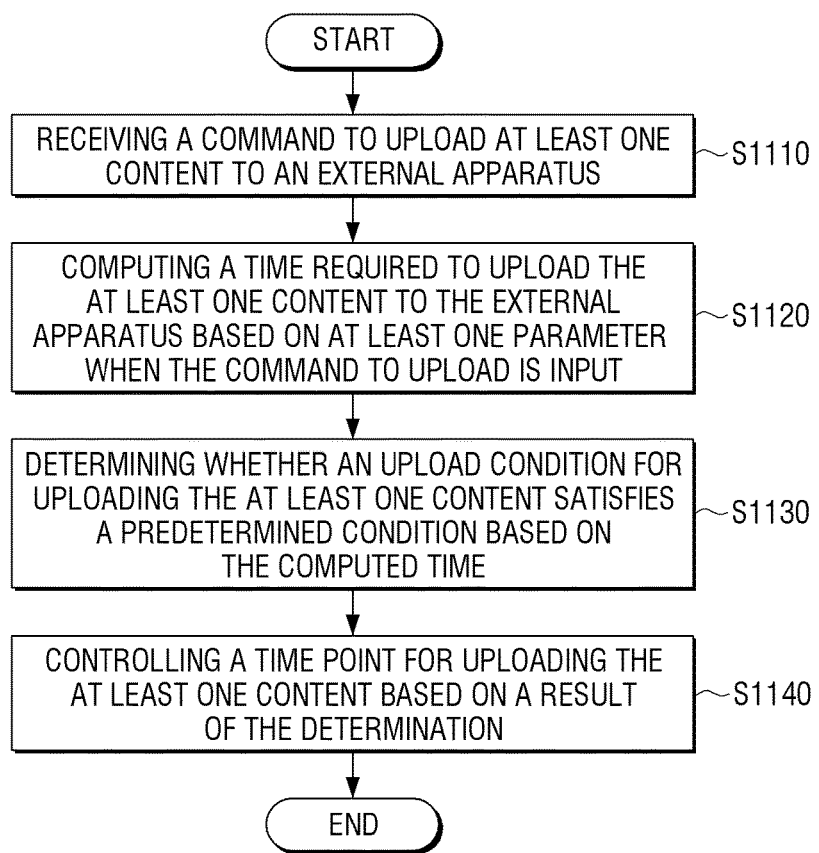
FIG. 11 is a flowchart provided to explain a method for controlling an electronic apparatus according to an embodiment of the present disclosure.

FIG. 11 is a flowchart provided to explain a control method of the electronic apparatus according to an embodiment of the present disclosure.

Referring to FIG. 11, an upload command for uploading at least one content to the external apparatus is received at operation S1110.

When the upload command is input, a time required to upload the at least one content to the external apparatus is computed based on at least one parameter at operation S1120. Here, the at least one parameter may include at least one of a parameter related to an internal environment of the electronic apparatus and a parameter related to a network environment where the electronic apparatus performs communication with the external apparatus.

Here, the parameter related to the internal environment of the electronic apparatus may include at least one of the size of the at least one content, residual amount of the electronic apparatus, load applied to the processor CPU at the time point the upload command is input, and memory size of the electronic apparatus.

Further, the parameter related to the network environment may include at least one of RSSI of the network, available bandwidth of the network, ID of where the electronic apparatus is located, RTT of the network, at least one TCP path and information on a destination to upload the at least one content.

Based on the computed time, determining whether an upload condition for uploading the at least one content satisfies a predetermined condition at operation S1130, and a time point of uploading the at least one content is controlled based on a result of the determination at operation S1140. Here, the predetermined condition may vary depending on the application where the uploading of the at least one content is being performed.

Further, if the upload condition satisfies the predetermined condition, at least one content may be uploaded to the external apparatus, and if the upload condition does not satisfy the predetermined condition, uploading of the at least one content may be delayed.

Further, in a state where uploading at least one content is being delayed, when a predetermined event occurs, the time required to upload the at least one content to the external apparatus is re-computed, it may be determined whether the upload condition for uploading the at least one content satisfies the predetermined condition, and it may be re-decided whether to upload the at least one content.

Further, when a mode select command for selecting an upload mode of at least one content is input, the time point of uploading the at least one content may be controlled according to the selected mode. Here, when a predetermined mode is selected according to the mode select mode, the time point where the power consumed by the uploading of the at least one content is minimized may be determined based on the computed time and the at least one parameter, and at least one content may be uploaded at the determined time point.

According to the aforementioned various embodiments, battery power consumption caused by contents and uploading may be minimized by controlling the uploading time point of contents without user intervention.

A control method of the electronic apparatus according to various embodiments of the present disclosure may be realized as a program and stored in various record media.

That is, a computer program that can be processed by various processors to execute the aforementioned various control methods may be stored in record media and used.

For example, a non-transitory computer readable medium that stores a program for receiving an upload command for uploading at least one content to an external apparatus, computing a time required to upload the at least one content to the external apparatus based on a at least one parameter when the upload command is input, determining whether an upload condition for uploading the at least one content satisfies a predetermined condition based on the computed time, and controlling a time point for uploading the at least one content based on a result of the determination.

Here, the non-transitory computer readable medium does not refer a medium that stores data for a short period of time such as a register, a cache, a memory, and the like, but a medium readable by devices and that stores data semi-permanently. In an embodiment, the aforementioned various middleware or programs may be stored in a non-transitory computer readable medium such as a compact disc (CD), a digital versatile disc (DVD), a hard disk, a blue ray disk, a universal serial bus (USB), a memory card, ROM, and the like, and be provided.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An electronic apparatus comprising:
   a communicator;
   a user interface; and
   a processor configured to:
      based on an upload command input by the user interface, compute a time required to upload at least one content to an external apparatus through the communicator based on at least one parameter,
      identify whether an upload condition for uploading the at least one content satisfies a predetermined condition based on the computed time and a type of application used for uploading the at least one content,
      identify a time point for uploading the at least one content based on the computed time and the type of application used for uploading the at least one content, and
      control the time point for uploading the at least one content based on a result of the identification of the time point.

2. The electronic apparatus according to claim 1, wherein the at least one parameter comprises at least one of a parameter related to an internal environment of the electronic apparatus and a parameter related to a network environment in which the electronic apparatus performs communication with the external apparatus.

3. The electronic apparatus according to claim 2,
   wherein the parameter related to the internal environment of the electronic apparatus comprises at least one of a size of the at least one content, a residual quantity of the electronic apparatus, a load applied to the processor at a time point at which the upload command is input, and a memory size of the electronic apparatus, and
   wherein the parameter related to the network environment comprises at least one of a received signal strength information (RSSI) of the network, an available bandwidth of the network, a cell identifier (ID) of where the electronic apparatus is located, a round trip time (RTT) of the network, at least one transmission control protocol (TCP) path, and information on a destination to which the at least one content is to be uploaded.

4. The electronic apparatus according to claim 1, wherein the predetermined condition varies depending on an application in which the uploading of the at least one content is performed.

5. The electronic apparatus according to claim 4, wherein if a RSSI value is sensed below of a predetermined intensity, a time point for uploading the at least one content in a backup application is delayed according to the upload condition, and a time point for uploading the at least one content in a Social Network Service (SNS) application is not delayed regardless of the upload condition.

6. The electronic apparatus according to claim 4, wherein the processor is further configured to:
control the time point by uploading the at least one content to the external apparatus if the upload condition satisfies the predetermined condition, and
delay uploading the at least one content if the upload condition does not satisfy the predetermined condition.

7. The electronic apparatus according to claim 6, wherein, if a predetermined event occurs in a state where the at least one content is being delayed, the processor is further configured to:
re-compute the time required to upload the at least one content to the external apparatus,
identify whether the upload condition for uploading the at least one content satisfies the predetermined condition based on the recomputed time, and
re-identify whether to upload the at least one content according to a result of the identification of whether the upload condition for uploading the at least one content is satisfied.

8. The electronic apparatus according to claim 7, wherein the predetermined event comprises at least one of an event where an RSSI value is sensed same to or above of a predetermined intensity and an event where a time the uploading of the at least one content is delayed exceeds a predetermined time.

9. The electronic apparatus according to claim 1, wherein the processor is further configured to control the time point for uploading the at least one content according to a selected mode if a mode select command to select an uploading mode for the at least one content is input, and
wherein the uploading mode includes a first mode which the at least one content is uploaded immediately, and a second mode which the at least one content is uploaded at a later time point.

10. The electronic apparatus according to claim 1, wherein the processor is further configured to:
identify the time point at which power to be consumed by the uploading of the at least one content is minimized based on at least one of the computed time and the at least one parameter if a predetermined mode for controlling the time point is activated, and
upload the at least one content at the identified time point.

11. The electronic apparatus according to claim 1, further comprising:
a display,
wherein the processor is further configured to:
predict an amount of power to be consumed while the at least one content is being uploaded based on the computed time, and
control the display to display information indicating the predicted amount of power consumption.

12. A method for controlling an electronic apparatus, the method comprising:
based on receiving an upload command, computing a time required to upload at least one content to an external apparatus based on at least one parameter;
identifying whether an upload condition for uploading the at least one content satisfies a predetermined condition based on the computed time and a type of application used for uploading the at least one content;
identifying a time point for uploading the at least one content based on the computed time and the type of application used for uploading the at least one content; and
controlling the time point for uploading the at least one content based on a result of the identification of the time point.

13. The method according to claim 12, wherein the at least one parameter comprises at least one of a parameter related to an internal environment of the electronic apparatus and a parameter related to a network environment in which the electronic apparatus performs communication with the external apparatus.

14. The method according to claim 13,
wherein the parameter related to the internal environment of the electronic apparatus comprises at least one of a size of the at least one content, a residual quantity of the electronic apparatus, a load applied to the processor at a time point at which the upload command is input, and a memory size of the electronic apparatus, and
wherein the parameter related to the network environment comprises at least one of a received signal strength information (RSSI) of the network, an available bandwidth of the network, a cell identifier (ID) of where the electronic apparatus is located, a round trip time (RTT) of the network, at least one transmission control protocol (TCP) path, and information on a destination to which the at least one content is to be uploaded.

15. The method according to claim 12,
wherein the predetermined condition varies depending on an application in which the uploading of the at least one content is performed.

16. The method according to claim 15, wherein the controlling, if a RSSI value is sensed below of a predetermined intensity, comprises:
a time point for uploading the at least one content in a backup application is delayed according to the upload condition, and
a time point for uploading the at least one content in a Social Network Service (SNS) application is not delayed regardless of the upload condition.

17. The method according to claim 15, wherein the controlling comprises controlling the time point by uploading the at least one content to the external apparatus and delaying uploading the at least one content if the upload condition does not satisfy the predetermined condition.

18. The method according to claim 17, further comprising, if a predetermined event occurs in a state where the at least one content is being delayed:
re-computing the time required to upload the at least one content to the external apparatus;

identifying whether the upload condition for uploading the at least one content satisfies the predetermined condition based on the recomputed time; and re-identifying whether to upload the at least one content according to a result of the identification of whether the upload condition for uploading the at least one content is satisfied.

19. The method according to claim 12, wherein the controlling comprises controlling the time point for uploading the at least one content according to a selected mode if a mode select command to select an uploading mode for the at least one content is input, and wherein the uploading mode includes a first mode which the at least one content is uploaded immediately, and a second mode which the at least one content is uploaded at a later time point.

20. The method according to claim 12, wherein the controlling comprises:

identifying the time point at which power to be consumed by the uploading of the at least one content is minimized based on at least one of the computed time and the at least one parameter if a predetermined mode for controlling the time point is activated; and uploading the at least one content at the identified time point.

* * * * *